United States Patent
Hales et al.

(10) Patent No.: US 9,277,103 B1
(45) Date of Patent: Mar. 1, 2016

(54) WIRELESS SPEAKER AND DIGITAL CAMERA

(71) Applicant: ZAGG Intellectual Property Holding Co., Inc., Salt Lake City, UT (US)

(72) Inventors: Randy Hales, Salt Lake City, UT (US); Paul Faerber, Pleasant Grove, UT (US)

(73) Assignee: ZAGG Intellectual Property Holding Co., Inc., Salt Lake City, UT (US)

( * ) Notice: Subject to any disclaimer, the term of this patent is extended or adjusted under 35 U.S.C. 154(b) by 0 days.

(21) Appl. No.: 14/838,810

(22) Filed: Aug. 28, 2015

(51) Int. Cl.
| H04N 5/225 | (2006.01) |
| H04N 5/232 | (2006.01) |
| H04N 1/21 | (2006.01) |
| H04R 3/00 | (2006.01) |
| H04R 1/02 | (2006.01) |

(52) U.S. Cl.
CPC ............... *H04N 5/2252* (2013.01); *H04N 1/21* (2013.01); *H04N 5/2253* (2013.01); *H04N 5/2254* (2013.01); *H04N 5/23206* (2013.01); *H04R 1/028* (2013.01); *H04R 3/00* (2013.01); *H04R 2420/07* (2013.01); *H04R 2499/11* (2013.01)

(58) Field of Classification Search
None
See application file for complete search history.

(56) References Cited

U.S. PATENT DOCUMENTS

| 2006/0061890 | A1* | 3/2006 | Otaka | H04N 5/2254 359/824 |
| 2007/0111739 | A1* | 5/2007 | Hamada | H04M 1/6066 455/466 |
| 2009/0237209 | A1* | 9/2009 | Seal | H04M 1/7253 340/7.21 |
| 2010/0035548 | A1* | 2/2010 | Hunn | H04W 88/04 455/41.3 |
| 2010/0110283 | A1 | 5/2010 | Shin | |
| 2011/0280431 | A1 | 11/2011 | Ho | |
| 2012/0169897 | A1* | 7/2012 | Karn | H04N 5/772 348/231.2 |
| 2013/0100989 | A1 | 4/2013 | Copeland et al. | |
| 2014/0202787 | A1* | 7/2014 | Richardson | H04B 1/3888 181/202 |

OTHER PUBLICATIONS

Hotref "Slimline MP3 Mini Speaker," http://www.hotref.com/Slimline-MP3-Mini-Speaker-p-3183.html. As Accessed on this date: Jul. 30, 2014.
amazon.com "HDE Collapsible Mini Hamburger Travel Pocket Keychain Capsule Speaker," http://www.amazon.com/HDE-Rechargeable-Portable-Keychain Capsule/dp/B00AFHV6LK/ref=sr_1_1?ie=UTF8&qid=1406736970&sr=8-1&keywords=speaker+keychain. As Accessed on this date: Jul. 30, 2014.

(Continued)

*Primary Examiner* — Sinh Tran
*Assistant Examiner* — Mark Monk
(74) *Attorney, Agent, or Firm* — Thorpe, North & Western, LLP (57) ABSTRACT

A wireless speaker and digital camera device comprises a speaker, a lens, and image sensor, a processor, a wireless transceiver, a digital memory device, a battery and a shutter button to cause the at least one processor to capture a still image or video from the image sensor and store a captured image or video in the digital memory device. The processor and the wireless transceiver being configured to pair with a portable, hand-held computer. The device also having a play button to cause the processor and the transceiver to wirelessly receive music data from the portable, hand-held computer and play the music data through the speaker. The device can have a microphone and the processor can be capable of suspending operation of the speaker during operation of the microphone.

20 Claims, 5 Drawing Sheets

(56) References Cited

OTHER PUBLICATIONS amazon.com "Ivation Super Portable Bluetooth Keychain Speaker," http://www.amazon.com/Ivation-Bluetooth-Rechargeable-Keychain-Loudspeaker/dp/B00K00RR42/ref=sr_1_8?ie=UTF8&qid=1406736970&sr=8- 8&keywords=speaker+keychain. As Accessed on this date: Jul. 30, 2014.

amazon.com "Fidelity Mist Plus Portable Speaker," http://www.amazon.com/Fidelity-Mist-Portable-Speaker-players-Orange/dp/B000TFKONO/ref=sr___43?ie=UTF8&qid=1406737745&sr=8-43& keywords=speaker+keychain. As Accessed on this date: Jul. 30, 2014.

amazon.com "Hype HY-295-SLV Portable Speaker," http://www.amazon.com/Hype-HY-295-SLV-Portable-Speakers-Packaging/dp/B00E9GXZ1C/ref=sr_1_49?ie=UTF8&qid=1406737924&sr=8-49&keywords=speaker+keychain. As Accessed on this date: Jul. 30, 2014.

Talk Business."TUMI Bluetooth Smart Key Fob," http://talkbusinessmagazine.co.uk/gadgets-to-sigh-for/ . As Accessed on this date: Jul. 30, 2014.

Swap "sWaP Nova Keyring Phone," http://www.filesaveas.com/swapnova.html. As Accessed on this date: Jul. 30, 2014.

SPYTEC "Video Camera Keychain" http://www.spytecinc.com/budget-video-keychain.html?gclid=Clr67_PE7b8CFQKpaQodMmYAdw#.UtJ9koQUASHs. As Accessed on this date: Jul. 30, 2014.

Contour "Connect" http://contour.com/connect. As Accessed on this date: Jun. 25, 2015.

amazon.com. "Looxcie LX1 Wearable Bluetooth Camcorder, iPhone and Android Compatible," http://www.amazon.com/Looxcie-LX1-Bluetooth-Camcroder-Compatible/dp/B004D17F76. As Accessed on this date: Jun. 25, 2015.

* cited by examiner

WIRELESS SPEAKER AND DIGITAL CAMERA

BACKGROUND

1. Field of the Invention

The present invention relates generally to a wireless speaker and digital camera.

2. Related Art

Wireless speakers have been developed that receive and play streaming music data from a cellular phone. Such wireless speakers are often shaped and sized as cans or bricks, and can have batteries for stand-alone operation.

Digital cameras are common and can capture still and moving pictures (or video). Such cameras typically store image data on a removable storage medium, such as a flash memory card, that can be removed and inserted into a computer to download the image data.

SUMMARY OF THE INVENTION

It has been recognized that it would be advantageous to develop a combined wireless speaker and digital camera to both play streaming music from a cellular phone or the like, and also capture still and video images. It has been recognized that it would be advantageous to develop such a combined wireless speaker and digital camera that is readily usable and transportable to encourage continuous use and facilitate immediate capture of images.

The invention provides a wireless speaker and digital camera device comprising a housing having a top, a front side and a back side. The housing has a lens aperture in the front side and a speaker aperture. A speaker is disposed in the housing and is oriented to direct sound through the speaker aperture. A lens is disposed in the housing and is oriented to face the lens aperture in the front side of the housing. An image sensor is disposed in the housing and is positioned and oriented to receive light from the lens. One or more processors are disposed in the housing and coupled to the speaker and the image sensor. One or more wireless transceivers are disposed in the housing and coupled to the processor(s). A digital memory device is disposed in the housing and coupled to the processor(s). A battery is disposed in the housing and coupled to the processor(s). A shutter button is carried by the housing and coupled to the processor(s) configured to cause the processor(s) to capture a still image or video from the image sensor and store a captured image or video in the digital memory device. The processor(s) and the wireless transceiver(s) are configured to pair with a portable, hand-held computer. A play button is carried by the housing and coupled to the processor(s) to cause the processor(s) and the transceiver(s) to wirelessly receive music data from the portable, hand-held computer with the wireless transceiver(s), and play the music data through the speaker.

In accordance with a more detailed aspect of the invention, the device can further comprise a microphone disposed in the housing and coupled to the processor(s). The processor(s) can be capable of suspending operation of the speaker during operation of the microphone. The processor(s) can be configured to both: i) record audio from the microphone in the digital memory device; and ii) transmit audio from the microphone to a portable, hand-held computer with the transceiver(s).

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 1b is a rear perspective view of the wireless speaker and digital camera of FIG. 1a;

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

The term "portable, hand-held computer" is used broadly herein to refer to a computer or multi-media device that is one-piece and that is portable and handheld, such as cellular or cell phones, smart phones, tablets or tablet computers, so called phablets, digital music players (MP3 players), etc. The portable, hand-held computer can have a battery and memory and a processor with software running thereon. The portable, hand-held computer can have WiFi and Bluetooth connectivity, and can have a wireless transmitter, receiver, or transceiver. In addition, the portable, hand-held computer can include a digital camera. The term "cellular phone" is used broadly herein to refer to any communication device with wireless communication capability. Thus, the cellular phone or communication device can connect and communicate over a cellular network. In addition, the cellular phone or communication device can wirelessly couple to a wireless area network, which in turn can couple to a telephone network or line.

The term "computer" is used herein to refer to a portable, hand-held computer, as described above, as well as other computing devices or platforms, such as desk-top or lap-top computers, etc.

The term "transceiver" is used herein to refer to a transmitter for transmitting a signal, a receiver for receiving a signal, or both a transmitter and a receiver. The transceiver can both send and receive, or can include a transmitter for transmitting a signal, and a receiver for receiving a signal.

The term "ferromagnetic" is used herein to refer to a material or element that has magnetic properties and/or an ability to magnetically couple, either by being magnetic, or being magnetically attracted to a magnet (such as by containing iron) such that one ferromagnetic material or element is magnetically attracted to another ferromagnetic material or element. Thus, a ferromagnetic coupler is a magnet or is magnetic, such as a permanent magnet, or is attracted to magnets, such as by containing iron.

DESCRIPTION

Figure 5:
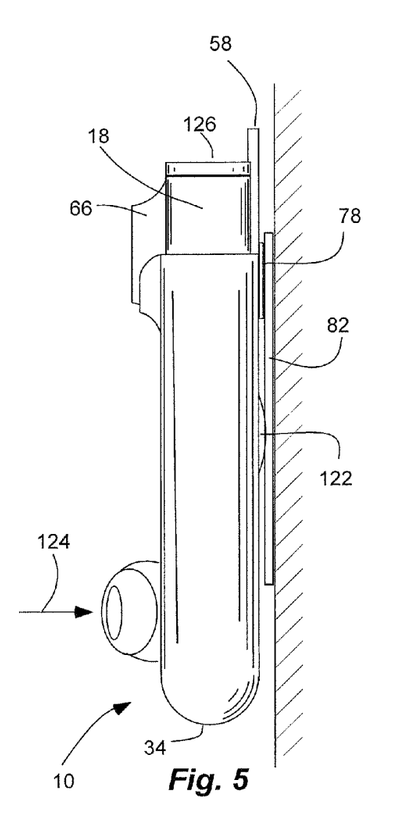
FIG. 5 is side view of the wireless speaker and digital camera of FIG. 1 shown in use with a mounting plate.
Figure 6:
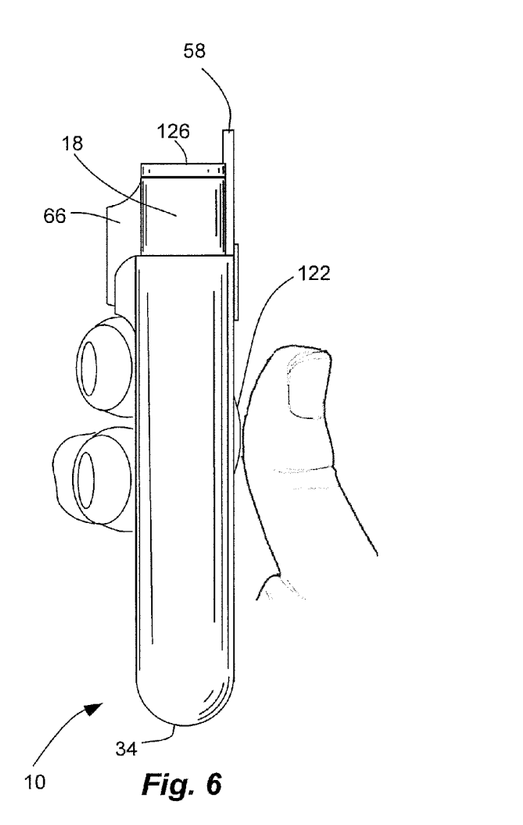
FIG. 6 is a side view of the wireless speaker and digital camera of FIG. 1 shown in being held in a user's hand and operated.
Figure 7:
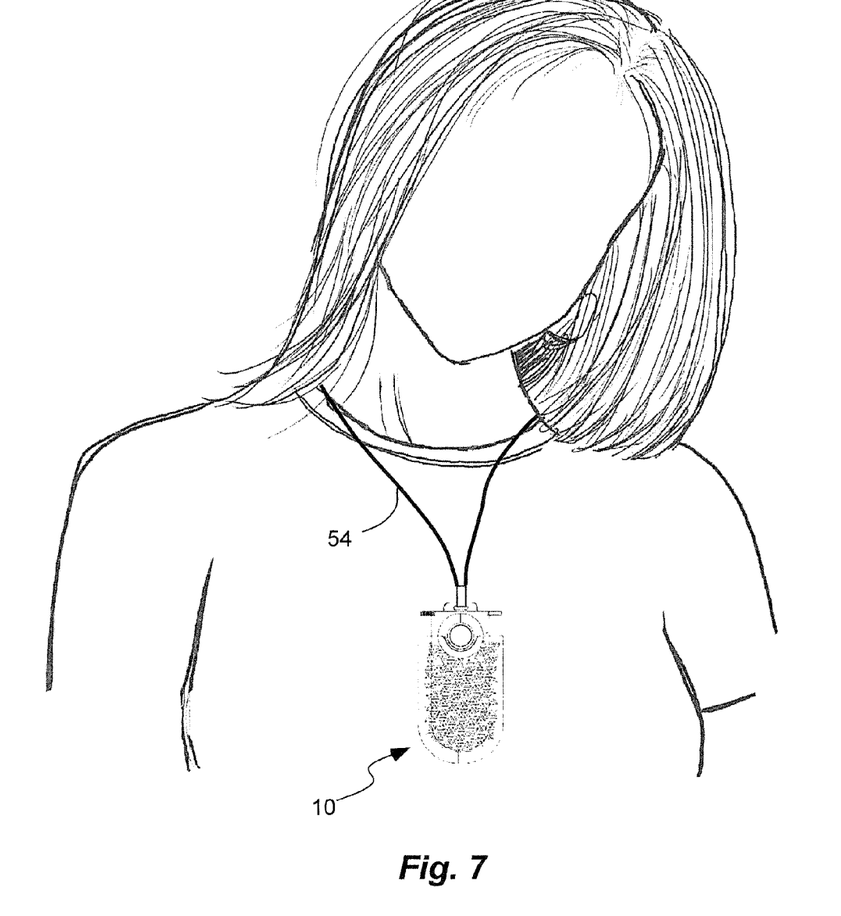
FIG. 7 is a front view of the wireless speaker and digital camera of FIG. 1 shown in use and pendant from a loop and handing from a user's neck.

As illustrated in FIGS. 1a-7, a wireless speaker and digital camera device, indicated generally at 10, in an example implementation in accordance with the invention is shown for use with a portable, hand-held computer 14 (FIG. 7). The wireless speaker and digital camera combines the functions of a wireless speaker to play streaming music wirelessly sent by the portable, hand-held computer, and a digital camera to capture still and/or moving images (video). In addition, the wireless speaker and digital camera is configured to be worn about a user's neck and pendent therefrom to position the wireless speaker for listening, and to position the digital camera for ease of use and ready accessibility. The configuration of the wireless speaker and digital camera promotes being worn, either pendent around the user's neck, or in a shirt pocket, and thus promotes ready use to capture images.

The wireless speaker and digital camera 10 can have a housing 18 with a top 22, a front side 26, a back side 30, and a bottom 34. In one aspect, the bottom 34 of the housing 18 can be rounded with a curvature that extends across the entire bottom (from side to side, and from front to back), so that the housing has a rounded bottom. The rounded bottom can provide a more comfortable grip and facilitate holding the device or the housing in a user's hand or palm. In addition, the rounded bottom can facilitate insertion of the device into a pocket. The front side 26 can have a lens aperture 38, a speaker aperture 42 and a microphone aperture 46 that extend through a wall of the housing. The housing can be formed of plastic, such as by injection molding. The housing can be rigid, and formed of a rigid wall with a hollow therein.

In addition, the housing can have one or more holes, apertures or bores 50 at or near the top 22 thereof to receive a loop 54 (FIG. 7), such as a lanyard. The loop 54 can be coupled to the housing 18 with the housing pendant from the loop. A user's neck can be inserted through the loop so that the device and housing can be pendent from the user's neck, or worn by the user. Thus, the device can be a pendent device positioned for ready use, as either the speaker or the camera. The speaker can be positioned near the user's ear. The camera can be positioned near the user's point of view, and within ready reach.

In one aspect, the device or the housing can have a mounting tab 58 coupled to the housing, and extending along an exterior of the back side 30 of the housing. The mounting tab can be formed from metal and can be a metal strip. A top 62 portion of the tab 58 can extend beyond the top 22 of the housing, and can have the hole 50 therein to receive the loop 54. Thus, the housing 18 can be suspended from the tab 58, with the tab providing support for the housing.

In one aspect, a protrusion 66 can extend from the front side 26 of the housing 18. The protrusion 66 can be located at or near the top of the housing. The protrusion 66 can provide a stop to which the user's finger can abut when holding the housing, as shown in FIG. 6. The protrusion 66 can circumscribe the lens aperture 38.

In another aspect, a grip sleeve 70 can be disposed over at least a lower portion of the housing 18. In one aspect, the grip sleeve 70 can cover at least a lower two-thirds of the housing 18. In another aspect, the grip sleeve can cover at least a lower three-fourths of the housing. In another aspect, the grip sleeve can cover at least a lower four-fifths of the housing. The grip sleeve can cover a majority of a height of the housing so that the housing can be griped. The grip sleeve 70 can be formed of a more flexible material (than the housing), such as a rubber or silicone, or the like. In one aspect, the grip sleeve can have a plurality of indentations and/or protrusions to facilitate griping the device or the housing. The grip sleeve can have a cup shape with an open top through which the bottom of the housing can be inserted. The grip sleeve can be removably disposed on the housing, and can be slid onto and off of the housing. The housing can have a hollow therein matching an exterior of the housing so that an interior of the sleeve matches and abuts to the exterior of the housing. The sleeve can have apertures located and corresponding to the speaker aperture 42 in the housing 18 (and/or the microphone or lens apertures). In addition, the sleeve can have at least an indentation 74 therein at or near the open top, and corresponding to the protrusion 66 in the housing. The sleeve can have a protrusion at the indentation 74 corresponding to and matching the protrusion 66 in the housing, and covering at least a portion of the protrusion 66. Thus, the protrusion in the sleeve can abut the user's finger to provide grip.

In another aspect, the device or housing can have a coupler 78 disposed on the back side 30 of the housing (and/or on the mounting tab 58 of the housing) to releasably couple the housing and the device to another object, such as a mounting plate 82 (FIG. 5). In one aspect, the coupler can be a magnet or ferromagnetic, and the mounting plate can be metal (or ferromagnetic). In one aspect, the mounting plate can be pendant from the loop or lanyard, and the housing or device can be coupled to the mounting plate by the coupler. The coupler can allow the housing or the device to be hung from or mounted on another object. In addition, the housing can pivot about the coupling, as discussed in greater detail below.

Figure 1A:
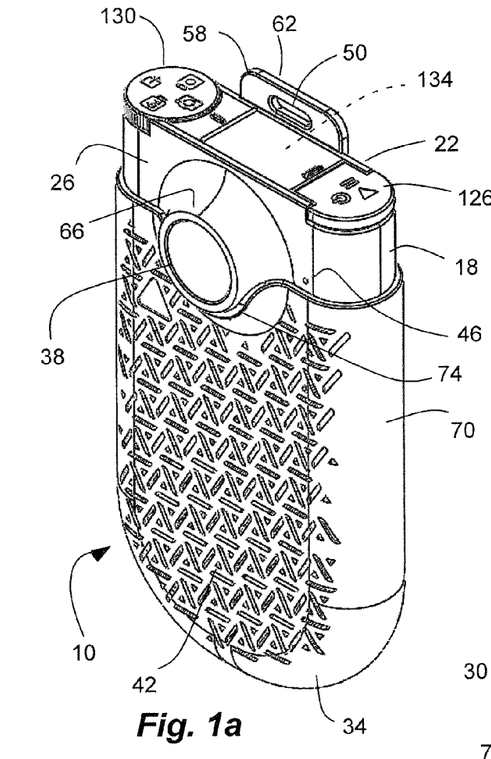
FIG. 1a is a front perspective view of a wireless speaker and digital camera in accordance with an embodiment of the present invention.
Figure 1B:
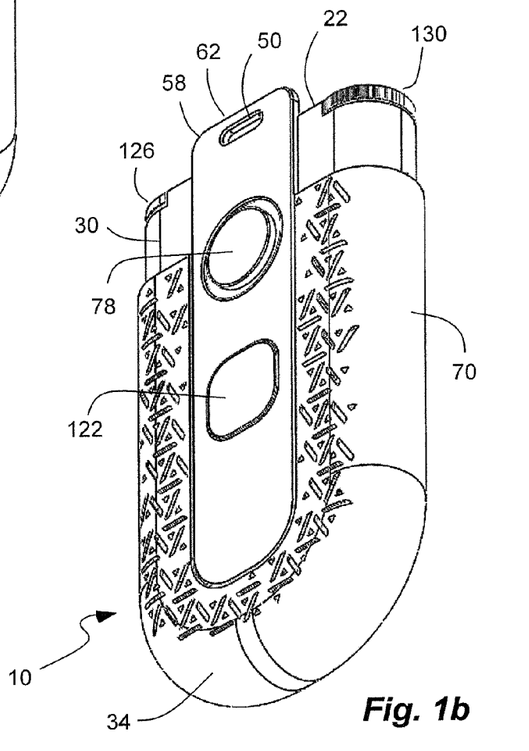
Figures 2, 3:
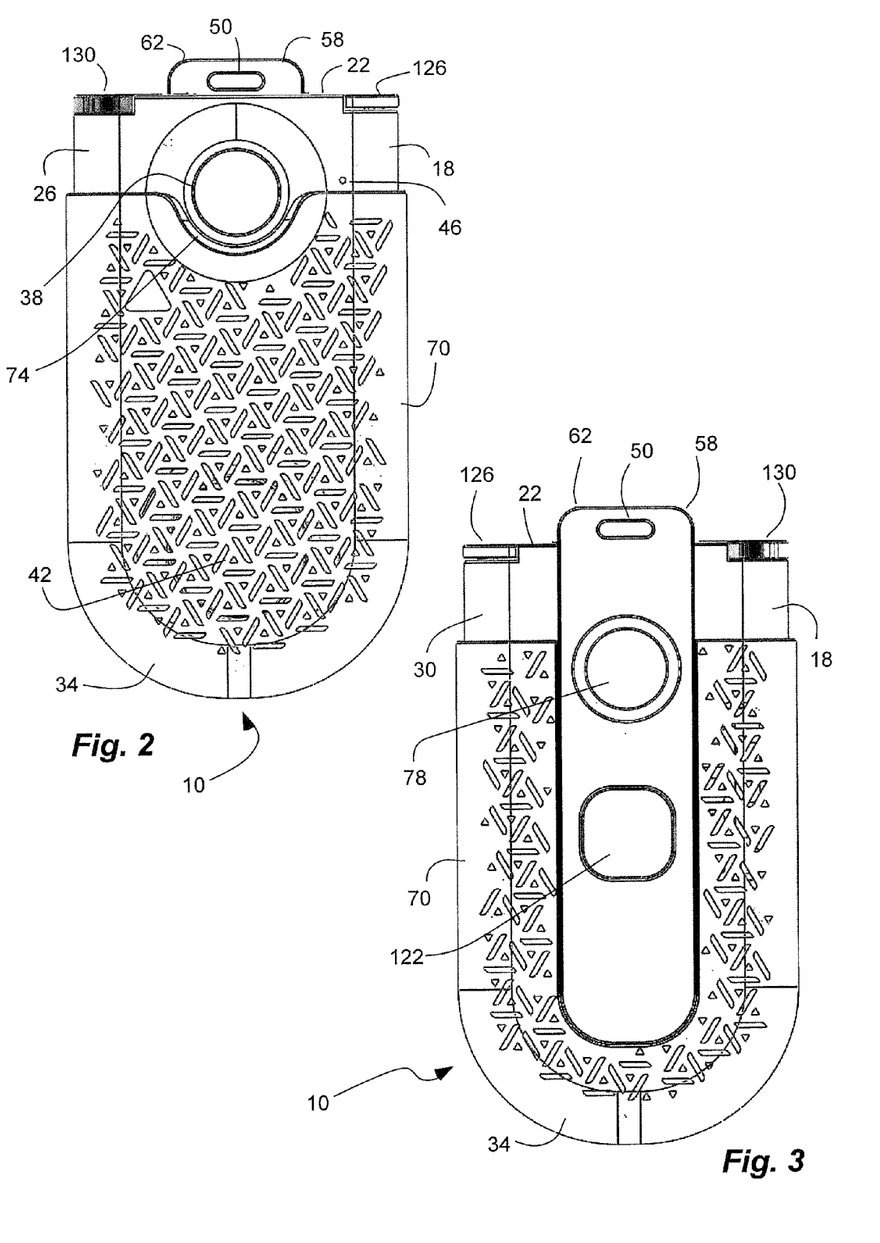
FIG. 2 is a front view of the wireless speaker and digital camera of FIG. 1.
FIG. 3 is a rear view of the wireless speaker and digital camera of FIG. 1.
Figure 4:
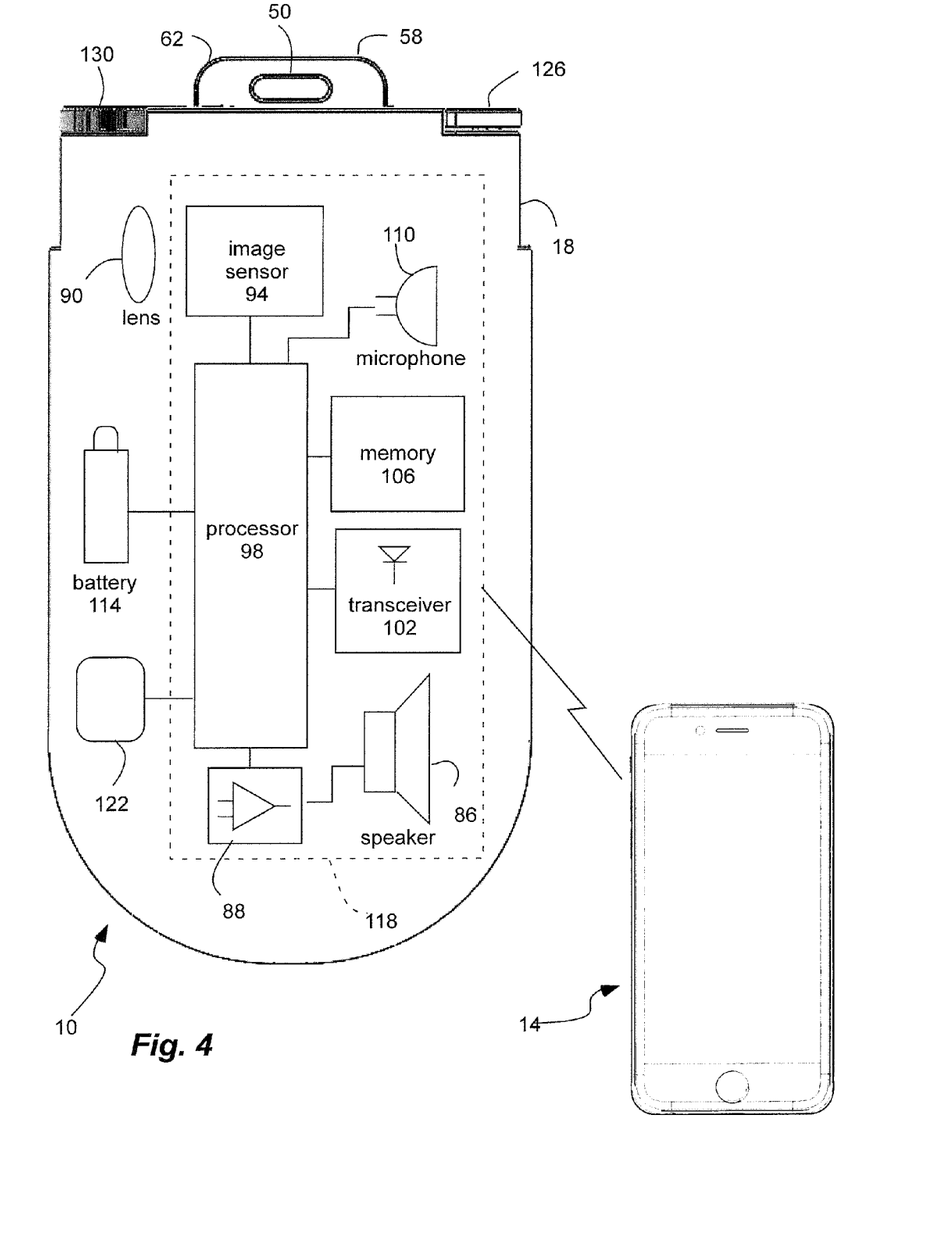
FIG. 4 is a front schematic view of the wireless speaker and digital camera of FIG. 1 shown in use with a portable, hand-held computer, namely a cellular phone.

Referring to FIG. 4, the device 10 can have a speaker 86, a lens 90, an image sensor 94, a transceiver 102, a digital memory device 106, a microphone 110, a battery 114 or power source, and one or more processors. In one aspect, the processor 98 can be electrically and operatively coupled to the speaker 86, the image sensor 94, the transceiver 102, the digital memory device 106, the microphone 110, and the battery 114 or power source. In another aspect, the processor 118 can include the wireless transceiver and/or the digital memory device, and can be electrically and operatively coupled to the speaker 86, the image sensor 94, the microphone 110, and the battery 114 or power source.

The speaker 86 is disposed in the housing 18, and oriented to direct sound through the speaker aperture(s) 42. In one aspect, the speaker can be oriented to face the speaker aperture(s) 42 in the front side 26 of the housing. In one aspect, the speaker can be mounted to and carried by the housing. In another aspect, the speaker can be mounted to and carried by a circuit board or the like, which in turn can be mounted to the housing. The speaker can be large with respect to a speaker of the portable, hand-held computer 14, and can be configured to project sound in a larger environment, and for listening by a larger number of people. The speaker 86 can have a width or diameter greater than half of a width of the housing. The width or diameter of the speaker can extend across a majority of the width of the housing. The speaker aperture 42 can comprise a plurality of apertures arrayed in a matrix extending over a majority of a front surface of the speaker, forming a grill. The device 10 and/or the processor 98 can further comprise an amplifier 88. The speaker 86 and amplifier 88 can amplify the audio signal from the portable, hand-held computer so that multiple people can listen to music or communications.

In addition, the lens 90 can be disposed in the housing 18 an oriented to face the lens aperture 38 in the front side of the housing. In one aspect, the lens can be carried by the housing. In another aspect, the lens can be carried by a circuit board or the like. The lens can be disposed in the protrusion 66 in the front side of the housing. Thus, the protrusion can allow for thicker optics. In addition, the protrusion 66 can act to resist inadvertent blockage of the lens when held by the user. The protrusion 66 can provide tactile feedback for proper holding. The device and/or the lens can include focusing drivers or the like.

The image sensor 94 is disposed in the housing 18 and positioned and oriented to receive light from the lens. The image sensor converts an optical image or light from the lens to an electronic signal. The image sensor can be a complementary metal-oxide-semiconductor (CMOS), a charge-coupled device (CCD), or the like. In addition, the image sensor can be coupled to an analog-to-digital (A/D) converter. The A/D converter converts the electronic signal into binary numbers, which result in digital images. In one aspect, the device can include a mechanical shutter. In another aspect, the device can include an electrical or electronic shutter. In one aspect, the image sensor can be mounted to and carried by the housing. In another aspect, the image sensor can be mounted to and carried by a circuit board.

The microphone 110 is disposed in the housing 18, and coupled to the at least one processor 98. The microphone 110 can be disposed adjacent to the microphone aperture 46 in the housing. The microphone can detect sound that can be recorded or saved along with the video in the digital memory device 106. In addition, the microphone can detect or sense audio. The processor 98 can be configured to both: i) record audio from the microphone in the digital memory device; and ii) transmit audio from the microphone to a portable, hand-held computer 14 with the at least one transceiver 102. Thus, the microphone can be used for both video recording, and transmitting audio for cellular communication. Thus, the device can operate as a speaker phone. The device can be configured to toggle between playing music, i.e. receiving music via the transceiver, and communication, i.e. sending and receiving audio communication via the transceiver. The device can have a button (such as the play button described below) that can send a control signal via the transceiver from the device or processor to the portable, handheld computer to switch or toggle the portable, handheld computer from one way streaming music data, to two way audio communication data.

The at least one processor 98 is disposed in the housing 18, and coupled to the speaker 86 and the image sensor 94. In one aspect, the processor 98 can be carried by a circuit board or the like. In addition, at least one wireless transceiver 102 is disposed in the housing 18, and coupled to the at least one processor 98. Furthermore, the digital memory device 106 is disposed in the housing 18, and coupled to the at least one processor 98. In one aspect, the digital memory device can include one or more chips, carried by a circuit board, or internal to the processor. In another aspect, the digital memory device can include an internal or removable flash memory card. The battery 114 is disposed in the housing 18, and coupled to the at least one processor 98.

A shutter button 122 can be carried by the housing 18, and coupled to the at least one processor 98. The shutter button 122 is configured to cause the at least one processor 98 to capture a still image or video from the image sensor 94 and store a captured image or video in the digital memory device 106. In addition, the shutter button 122 can be configured to both start and stop the processor 98 from capturing video, or begin and end the storage of video to the digital memory device.

In one aspect, the shutter button 122 can be disposed on the back side 30 of the housing 18. Thus, the shutter button can be easily accessed and pushed by a user's finger or thumb when being held, as shown in FIG. 6. In one aspect, the device or camera can be a point-and-shoot type camera, without a viewfinder. The shutter button can be disposed through the mounting tab 58, or an aperture in the mounting tab.

In another aspect, the shutter button 122 can protrude from the back side 30 of the housing 18 (and/or mounting tab 58), and can abut to another object, such as the mounting plate 82 (as shown in FIG. 5) when the housing is coupled to the mounting plate. Thus, a force 124 applied to the front side 26 of the housing 18 or device presses the shutter button 18 against another object, such as the mounting plate 82, to activate the shutter button. Thus, a user can take a picture or start recording video simply by pressing the device or housing against the mounting plate, or against another object, such as their chest.

In another aspect, the processor 98 can be capable of suspending operation of the speaker 86, and/or operation of the transceiver, during operation of the microphone 110. For example, when the shutter button 122 is pressed by the user, the processor can pause or mute the speaker to allow the microphone to record audio.

The at least one processor 98 and the at least one wireless transceiver 102 are configured to pair with the portable, handheld computer 14 and form a wireless connection. A play button 126 can be carried by the housing 18, and can be disposed on the top of the housing, and can be coupled to the at least one processor 98. The play button 126 can be configured to cause the at least one processor 84 and the at least one transceiver 102 to wirelessly receive music data from the portable, hand-held computer 14 with the at least one wireless transceiver 102, and play the music data through the speaker 86. In addition, the play button 126 can further be configured to pause or mute the transfer of music data, and/or advance the music data, etc. The play button can cause the processor to send one or more command signals from the device 10 through the transceiver 102 to the portable, hand-held computer 14 to control the transfer of music data and/or other audio data (such as cellular communication data).

A camera selector 130 can be carried by the housing 18, and can be disposed on the top of the housing, and can be coupled to the at least one processor 98. The camera selector 130 can be configured to select an image capture mode of the image sensor and/or processor. The camera selector can have at least two positions in one aspect, at least three positions in another aspect, and at least four positions in another aspect. The positions of the camera selector can including: a still shot mode, a variable video mode, a fixed video mode, and a download or transfer mode. The still shot mode is configured to cause the at least one processor 98 and the image sensor 94 to capture a still image from the image sensor, and store or record the captured still image in the digital memory device. The variable video mode is configured to cause the at least one processor 98 and the image sensor 94 to capture video for a variable duration determined manually by a user, and to store or record the captured video in the digital memory device. The variable duration can be manually determined by the user pressing the shutter button to start recording, and subsequently pressing the shutter button again to end recording. The fixed video mode is configured to cause the at least one processor 98 and the image sensor 94 to capture video for a predetermined time period. The predetermined time period can correspond to length restrictions imposed by popular social media sites. The download mode or transfer mode is configured to cause the at least one processor 98 to transfer captured video or still images or both. In one aspect, the processor 98 can transfer or allow access to the digital memory device 106 via a wired connection, such as through a port 134, such as a USB port. The port can be coupled to the processor and/or digital memory device. In addition, the port can be coupled to the battery 114 to allow the battery to be recharged.

As described above, the wireless speaker and digital camera device 10 is operable to receive audio data from the portable, hand-held computer 14, and transmit captured video and/or still images to the portable, hand-held computer or another computer. The at least one processor 98 can be configured to do one or more of the following:

- establish a wireless connection between the at least one wireless transceiver 102 and the portable, hand-held computer 14;
- receive the audio data from the portable, hand-held computer 14 with the at least one wireless transmitter 102;
- play the audio data through the speaker 86;
- capture a still image from the image sensor 94 when the camera selector 130 is in a still shot mode and the shutter button 126 is pushed, and store the still image in the digital memory device 106;
- capture video from the image sensor 94 when the camera selector 130 is in a variable video mode and the shutter button 126 is pushed and until the shutter button is pushed again, and store the video in the digital memory device 106;
- capture fixed video from the image sensor 94 for a predetermined time period when the camera selector 130 is in a fixed video mode and the shutter button 126 is pushed, and store the fixed video in the digital memory device 106;
- pause or mute the speaker 86 when the shutter button 126 is pushed;
- transmit a control signal to the portable, hand-held computer 14 with the wireless transceiver 102 to control transmission of audio data from the portable, hand-held computer, including advancing to a next audio data or advancing through the audio data; and
- transmit a control signal to the portable, hand-held computer 14 with the wireless transceiver 102 to toggle the portable, hand-held computer to toggle between transmitting different audio data, including music and communication.

The device 10 and/or processor(s) 98 can include at least one non-transitory machine readable storage medium having instructions embodied thereon for receiving audio data from the portable, hand-held computer 14 and transmitting captured video and/or still images to the portable, hand-held computer 14 or another computer, the instructions when executed by the at least one processor can perform one or more of the following:

- establishing a wireless connection between the at least one wireless transceiver 102 and the portable, hand-held computer 14;
- receiving the audio data from the portable, hand-held computer 14 with the at least one wireless transmitter 102;
- playing the audio data through the speaker 86;
- capturing a still image from the image sensor 94 when the camera selector 130 is in a still shot mode and the shutter button 126 is pushed, and store the still image in the digital memory device 106;
- capturing video from the image sensor 94 when the camera selector 130 is in a variable video mode and the shutter button 126 is pushed and until the shutter button is pushed again, and store the video in the digital memory device 106;
- capturing fixed video from the image sensor 94 for a predetermined time period when the camera selector 130 is in a fixed video mode and the shutter button 126 is pushed, and store the fixed video in the digital memory device 106;
- pausing or muting the speaker 86 when the shutter button 126 is pushed; and
- transmitting a control signal to the portable, hand-held computer 14 with the wireless transceiver 102 to control transmission of audio data from the portable, hand-held computer, including advancing to a next audio data or advancing through the audio data; and
- transmitting a control signal to the portable, hand-held computer 14 with the wireless transceiver 102 to toggle the portable, hand-held computer to toggle between transmitting different audio data, including music and communication.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless or wired communications.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A wireless speaker and digital camera device, comprising:
   a) a housing having a top, a front side and a back side, and the housing having a lens aperture in the front side and a speaker aperture;
   b) a speaker disposed in the housing and oriented to direct sound through the speaker aperture;
   c) a lens disposed in the housing and oriented to face the lens aperture in the front side of the housing;
   d) an image sensor disposed in the housing and positioned and oriented to receive light from the lens;
   e) at least one processor disposed in the housing and coupled to the speaker and the image sensor;
   f) at least one wireless transceiver disposed in the housing and coupled to the at least one processor;
   g) a digital memory device disposed in the housing and coupled to the at least one processor;
   h) a battery disposed in the housing and coupled to the at least one processor;
   i) a shutter button carried by the housing and coupled to the at least one processor configured to cause the at least one processor to capture a still image or video from the image sensor and store a captured image or video in the digital memory device;
   and j) the at least one processor and the at least one wireless transceiver being configured to pair with a portable, hand-held computer;
   k) a play button carried by the housing and coupled to the at least one processor configured to cause the at least one processor and the at least one transceiver to wirelessly receive music data from the portable, hand-held computer with the at least one wireless transceiver, and play the music data through the speaker;
   and l) a camera selector disposed on the top of the housing and coupled to the at least one processor, the camera selector configured to select an image capture mode and having at least four positions, including:
      i) a still shot mode configured to cause the at least one processor and the image sensor to capture a still image;
      ii) a variable video mode configured to cause the at least one processor and the image sensor to capture video for a variable duration determined manually by a user;
      iii) a fixed video mode configured to cause the at least one processor and the image sensor to capture video for a predetermined time period;
      and iv) a download mode configured to cause the at least one processor to transfer captured video or still images or both.

2. The device in accordance with claim 1, further comprising a microphone disposed in the housing and coupled to the at least one processor; and wherein the at least one processor is capable of:
   i) suspending operation of the speaker during operation of the microphone;
   ii) recording audio from the microphone in the digital memory device; and
   iii) transmitting audio from the microphone to a portable, hand-held computer with the at least one transceiver.

3. The device in accordance with claim 1, further comprising:
   a) a coupler disposed on the back side of the housing to releasably couple the housing to a mounting plate;
   b) the shutter button disposed on the back side of the housing; and
   c) the shutter button protruding from the back side of the housing and abutting to the mounting plate when the housing is coupled to the mounting plate, such that force applied to the front side of the housing presses the shutter button against the mounting plate to activate the shutter button.

4. The device in accordance with claim 1, further comprising:
   a loop coupled to the housing with the housing pendant from the loop.

5. The device in accordance with claim 4, further comprising:
   a) a mounting tab coupled to the housing and extending along an exterior of the back side of the housing;
   b) a top portion of the tab extending beyond the top of the housing and having a hole therein to receive the loop;
   c) a coupler being disposed on the tab; and
   d) the shutter button extending through the tab.

6. The device in accordance with claim 1, wherein the housing has a rounded bottom with a curvature extending across the entire bottom.

7. The device in accordance with claim 1, further comprising:
   a) a grip sleeve disposed over at least a lower portion of the housing, and covering at least a lower two-thirds of the housing; and
   b) an aperture in the grip sleeve corresponding to the speaker aperture in the housing.

8. The device in accordance with claim 1, further comprising:
   a) a protrusion extending from the front side of the housing and circumscribing the lens aperture and having the lens therein;
   b) a grip sleeve disposed over at least a lower portion of the housing, and covering at least a lower two-thirds of the housing;
   c) an aperture in the grip sleeve corresponding to the speaker aperture in the housing; and
   d) at least an indentation in the grip sleeve corresponding to the protrusion.

9. The device in accordance with claim 1, wherein pressing the shutter button causes the at least one processor to pause or mute the speaker.

10. The device in accordance with claim 1, wherein the wireless speaker and digital camera device is operable to receive audio data from the portable, hand-held computer and transmit captured video and/or still images to the portable, hand-held computer or another computer, and the at least one processor being configured to:
   establish a wireless connection between the at least one wireless transceiver and the portable, hand-held computer;
   receive the audio data from the portable, hand-held computer with the at least one wireless transmitter;
   play the audio data through the speaker;
   capture a still image from the image sensor when the camera selector is in the still shot mode and the shutter button is pushed, and store the still image in the digital memory device;
   capture video from the image sensor when the camera selector is in the variable video mode and the shutter button is pushed and until the shutter button is pushed again, and store the video in the digital memory device;
   capture fixed video from the image sensor for a predetermined time period when the camera selector is in the fixed video mode and the shutter button is pushed, and store the fixed video in the digital memory device;

pause or mute the speaker when the shutter button is pushed;

transmit a control signal to the portable, hand-held computer with the wireless transceiver to control transmission of audio data from the portable, hand-held computer, including advancing to a next audio data or advancing through the audio data; and transmit a control signal to the portable, hand-held computer with the wireless transceiver to toggle the portable, hand-held computer to toggle between transmitting different audio data, including music and communication.

11. A pendent wireless speaker and digital camera device, comprising:
   a) a housing having a top, a front side and a back side, and the housing having a lens aperture in the front side and a speaker aperture;
   b) a loop coupled to the housing with the housing pendant from the loop;
   c) a speaker disposed in the housing and oriented to direct sound through the speaker aperture;
   d) a lens disposed in the housing and oriented to face the lens aperture in the front side of the housing;
   e) an image sensor disposed in the housing and positioned and oriented to receive light from the lens;
   f) at least one processor disposed in the housing and coupled to the speaker and the image sensor;
   g) at least one wireless transceiver disposed in the housing and coupled to the at least one processor;
   h) a digital memory device disposed in the housing and coupled to the at least one processor;
   i) a battery disposed in the housing and coupled to the at least one processor;
   j) a shutter button carried by the housing and coupled to the at least one processor configured to capture a still image or video;
   k) the at least one processor and the at least one transceiver being capable of receiving music data from a portable, hand-held computer with the wireless transceiver, and playing the music data through the speaker;
   l) the at least one processor and the image sensor capable of capturing still images and video from the image sensor and storing the still images and video in the digital memory device;
   m) a microphone disposed in the housing and coupled to the at least one processor;
   and the at least one processor being capable of suspending operation of the speaker during operation of the microphone;
   and the at least one processor being capable of transmitting audio from the microphone to the portable, hand-held computer with the at least one transceiver;
   n) a protrusion extending from the front side of the housing and circumscribing the lens aperture and having the lens therein;
   o) grip sleeve disposed over at least a lower portion of the housing, and covering at least a lower two-thirds of the housing;
   p) an aperture in the grip sleeve corresponding to the speaker aperture in the housing;
   and g) at least an indentation in the grip sleeve corresponding to the protrusion.

12. The device in accordance with claim 11, further comprising:
   a) a coupler disposed on the back side of the housing to releasably couple the housing to a mounting plate;
   b) the shutter button disposed on a back side of the housing; and
   c) the shutter button protruding from the back side of the housing and abutting to the mounting plate when the housing is coupled to the mounting plate, such that force applied to the front side of the housing presses the shutter button against the mounting plate to activate the shutter button.

13. The device in accordance with claim 11, further comprising:
   a camera selector disposed on the top of the housing and coupled to the at least one processor, the camera selector configured to select an image capture mode and having at least four positions, including:
      i) a still shot mode configured to cause the at least one processor and the image sensor to capture a still image;
      ii) a variable video mode configured to cause the at least one processor and the image sensor to capture video for a variable duration determined manually by a user;
      iii) a fixed video mode configured to cause the at least one processor and the image sensor to capture video for a predetermined time period; and
      iv) a download mode configured to cause the at least one processor to transfer captured video or still images or both.

14. The device in accordance with claim 11, further comprising:
   the housing having a rounded bottom with a curvature extending across the entire bottom.

15. The device in accordance with claim 11, further comprising:
   a) a mounting tab coupled to the housing and extending along an exterior of the back side of the housing;
   b) a top portion of the tab extending beyond the top of the housing and having a hole therein to receive the loop;
   c) a coupler being disposed on the tab; and
   d) the shutter button extending through the tab.

16. The device in accordance with claim 12, wherein the wireless speaker and digital camera device is operable to receive audio data from the portable, hand-held computer and transmit captured video and/or still images to the portable, hand-held computer or another computer, and the at least one processor being configured to:
   establish a wireless connection between the at least one wireless transceiver and the portable, hand-held computer;
   receive the audio data from the portable, hand-held computer with the at least one wireless transmitter;
   play the audio data through the speaker;
   capture a still image from the image sensor when a camera selector is in a still shot mode and the shutter button is pushed, and store the still image in the digital memory device;
   capture video from the image sensor when the camera selector is in a variable video mode and the shutter button is pushed and until the shutter button is pushed again, and store the video in the digital memory device;
   capture fixed video from the image sensor for a predetermined time period when the camera selector is in a fixed video mode and the shutter button is pushed, and store the fixed video in the digital memory device;
   pause or mute the speaker when the shutter button is pushed;
   transmit a control signal to the portable, hand-held computer with the wireless transceiver to control transmission of audio data from the portable, hand-held computer, including advancing to a next audio data or advancing through the audio data; and transmit a control signal to the portable, hand-held computer with the wireless transceiver to toggle the portable, hand-held computer to toggle between transmitting different audio data, including music and communication.

17. The device in accordance with claim 11, further comprising:
   a) a grip sleeve disposed over at least a lower portion of the housing, and covering at least a lower two-thirds of the housing; and
   b) an aperture in the grip sleeve corresponding to the speaker aperture in the housing.

18. A pendent wireless speaker and digital camera device, comprising:
   a) a housing having a top, a front side and a back side, and the housing having a lens aperture in the front side and a speaker aperture;
   b) a loop coupled to the housing with the housing pendant from the loop;
   c) a speaker disposed in the housing and oriented to direct sound through the speaker aperture;
   d) a lens disposed in the housing and oriented to face the lens aperture in the front side of the housing;
   e) an image sensor disposed in the housing and positioned and oriented to receive light from the lens;
   f) at least one processor disposed in the housing and coupled to the speaker and the image sensor;
   g) at least one wireless transceiver disposed in the housing and coupled to the at least one processor;
   h) a digital memory device disposed in the housing and coupled to the at least one processor;
   i) a battery disposed in the housing and coupled to the at least one processor;
   j) a camera selector disposed on the top of the housing and coupled to the at least one processor, the camera selector configured to select an image capture mode and having at least four positions, including:
      1) a still shot mode configured to capture a still image;
      2) a variable video mode configured to capture video for a variable duration determined manually by a user;
      3) a fixed video mode configured to capture video for a predetermined time period; and
      4) a download mode configured to transfer captured video or still images or both;
   k) a coupler disposed on the back side of the housing to releasably couple the housing to a mounting plate;
   l) a shutter button disposed on a back side of the housing and coupled to the at least one processor configured to capture a still image or video; and
   m) the shutter button protruding from the back side of the housing and abutting to the mounting plate when the housing is coupled to the mounting plate, such that force applied to the front side of the housing presses the shutter button against the mounting plate to activate the shutter button.

19. A wireless speaker and digital camera device, comprising:
   a) a housing having a top, a front side and a back side, and the housing having a lens aperture in the front side and a speaker aperture;
   b) a speaker disposed in the housing and oriented to direct sound through the speaker aperture;
   c) a lens disposed in the housing and oriented to face the lens aperture in the front side of the housing;
   d) an image sensor disposed in the housing and positioned and oriented to receive light from the lens;
   e) at least one processor disposed in the housing and coupled to the speaker and the image sensor;
   f) at least one wireless transceiver disposed in the housing and coupled to the at least one processor;
   g) a digital memory device disposed in the housing and coupled to the at least one processor;
   h) a battery disposed in the housing and coupled to the at least one processor;
   i) a shutter button carried by the housing and coupled to the at least one processor configured to cause the at least one processor to capture a still image or video from the image sensor and store a captured image or video in the digital memory device;
   j) the at least one processor and the at least one wireless transceiver being configured to pair with a portable, hand-held computer;
   k) a play button carried by the housing and coupled to the at least one processor configured to cause the at least one processor and the at least one transceiver to wirelessly receive music data from the portable, hand-held computer with the at least one wireless transceiver, and play the music data through the speaker;
   l) the wireless speaker and digital camera device being operable to receive audio data from the portable, hand-held computer and transmit captured video and/or still images to the portable, hand-held computer or another computer, and the at least one processor being configured to:
   m) establish a wireless connection between the at least one wireless transceiver and the portable, hand-held computer;
   n) receive the audio data from the portable, hand-held computer with the at least one wireless transmitter;
   o) play the audio data through the speaker;
   p) capture a still image from the image sensor when a camera selector is in a still shot mode and the shutter button is pushed, and store the still image in the digital memory device;
   q) capture video from the image sensor when the camera selector is in a variable video mode and the shutter button is pushed and until the shutter button is pushed again, and store the video in the digital memory device;
   r) capture fixed video from the image sensor for a predetermined time period when the camera selector is in a fixed video mode and the shutter button is pushed, and store the fixed video in the digital memory device;
   s) pause or mute the speaker when the shutter button is pushed;
   t) transmit a control signal to the portable, hand-held computer with the wireless transceiver to control transmission of audio data from the portable, hand-held computer, including advancing to a next audio data or advancing through the audio data;
   and u) transmit a control signal to the portable, hand-held computer with the wireless transceiver to toggle the portable, hand-held computer to toggle between transmitting different audio data, including music and communication.

20. The device in accordance with claim 19, further comprising:
   a) a protrusion extending from the front side of the housing and circumscribing the lens aperture and having the lens therein;
   b) a grip sleeve disposed over at least a lower portion of the housing, and covering at least a lower two-thirds of the housing;
   c) an aperture in the grip sleeve corresponding to the speaker aperture in the housing; and
   d) at least an indentation in the grip sleeve corresponding to the protrusion.

* * * * *